United States Patent
Blesser et al.

(10) Patent No.: US 9,824,694 B2
(45) Date of Patent: Nov. 21, 2017

(54) DATA CARRIAGE IN ENCODED AND PRE-ENCODED AUDIO BITSTREAMS

(71) Applicant: TLS Corp., Cleveland, OH (US)

(72) Inventors: Barry Blesser, Belmont, MA (US); Timothy J. Carroll, Lancaster, PA (US)

(73) Assignee: TLS Corp., Cleveland, OH (US)

( * ) Notice: Subject to any disclaimer, the term of this patent is extended or adjusted under 35 U.S.C. 154(b) by 0 days.

(21) Appl. No.: 14/943,452

(22) Filed: Nov. 17, 2015

(65) Prior Publication Data

US 2016/0078874 A1    Mar. 17, 2016

Related U.S. Application Data

(63) Continuation-in-part of application No. 14/514,849, filed on Oct. 15, 2014, now Pat. No. 9,245,309, which is a continuation of application No. 14/216,041, filed on Mar. 17, 2014, now Pat. No. 8,918,326, which is a continuation-in-part of application No. 14/163,864,
(Continued)

(51) Int. Cl.
*G10L 19/018* (2013.01)
*G10L 19/022* (2013.01)
*H04L 29/06* (2006.01)

(52) U.S. Cl.
CPC ......... *G10L 19/018* (2013.01); *G10L 19/022* (2013.01); *H04L 69/22* (2013.01)

(58) Field of Classification Search
CPC ... G10L 19/018; G10L 19/022; G06T 1/0071; G06T 2201/0052; G06T 2201/0051; G06T 2201/0061; G06T 2201/0601; G11B 20/00891; G11B 20/00884; G06K 19/06037; H04L 2209/608; H04L 69/22
See application file for complete search history.

(56) References Cited

U.S. PATENT DOCUMENTS

| 5,029,217 A | 7/1991 | Chabries et al. |
| 5,450,490 A | 9/1995 | Jensen et al. |

(Continued)

FOREIGN PATENT DOCUMENTS

WO    2006116270 A2    11/2006

OTHER PUBLICATIONS

Arbitron, Critical Band Encoding Technology Audio Encoding System From Arbitron; Document 1050-1054; Revision E; pp. 1-27; Feb. 2008.

(Continued)

*Primary Examiner* — Kenny Cese
(74) *Attorney, Agent, or Firm* — Renner, Otto, Boisselle & Sklar, LLP

(57) ABSTRACT

A method for a machine or group of machines to carry watermark data in an encoded audio data frame of an audio signal includes receiving the encoded audio data frame having encoded therein a portion of the audio signal. The encoded audio data frame includes a plurality of data blocks, wherein the plurality of data blocks includes, a synchronization information block, at least one encoded data block, and an error check block. The method further includes receiving modified watermark data as modified based on a masking threshold analysis of the audio signal and transforming the encoded audio data frame into a modified encoded audio data frame.

10 Claims, 12 Drawing Sheets

Related U.S. Application Data filed on Jan. 24, 2014, now Pat. No. 8,768,714, which is a continuation-in-part of application No. 14/145,681, filed on Dec. 31, 2013, now Pat. No. 8,768,710, which is a continuation-in-part of application No. 14/097,716, filed on Dec. 5, 2013, now Pat. No. 8,768,005.

(56) References Cited

U.S. PATENT DOCUMENTS

| | | |
|---|---|---|
| 5,483,276 A | 1/1996 | Brooks et al. |
| 5,574,962 A | 11/1996 | Fardeau et al. |
| 5,579,124 A | 11/1996 | Aijala et al. |
| 5,581,800 A | 12/1996 | Fardeau et al. |
| 5,764,763 A | 6/1998 | Jensen et al. |
| 5,787,334 A | 7/1998 | Fardeau et al. |
| 6,421,445 B1 | 7/2002 | Jensen et al. |
| 6,571,144 B1 | 5/2003 | Moses et al. |
| 6,621,881 B2 | 9/2003 | Srinivasan |
| 6,674,876 B1 | 1/2004 | Hannigan et al. |
| 6,683,958 B2 | 1/2004 | Petrovic |
| 6,845,360 B2 | 1/2005 | Jensen et al. |
| 6,862,355 B2 | 3/2005 | Kolessar et al. |
| 6,871,180 B1 | 3/2005 | Neuhauser et al. |
| 6,996,237 B2 | 2/2006 | Jensen et al. |
| 7,031,491 B1 | 4/2006 | Donescu et al. |
| 7,222,071 B2 | 5/2007 | Neuhauser et al. |
| 7,239,981 B2 | 7/2007 | Kolessar et al. |
| 7,316,025 B1 | 1/2008 | Aijala et al. |
| 7,395,211 B2 | 7/2008 | Watson et al. |
| 7,471,987 B2 | 12/2008 | Crystal et al. |
| 7,483,835 B2 | 1/2009 | Neuhauser et al. |
| 7,483,975 B2 | 1/2009 | Kolessar et al. |
| 7,640,141 B2 | 12/2009 | Kolessar et al. |
| 7,961,881 B2 | 6/2011 | Jensen et al. |
| RE42,627 E | 8/2011 | Neuhauser et al. |
| 8,099,285 B2 | 1/2012 | Smith et al. |
| 2003/0128861 A1 | 7/2003 | Rhoads |
| 2003/0219143 A1 | 11/2003 | Moskowitz et al. |
| 2003/0231785 A1 | 12/2003 | Rhoads et al. |
| 2005/0157907 A1 | 7/2005 | Reed et al. |
| 2008/0275697 A1 | 11/2008 | Kentish et al. |
| 2009/0067671 A1* | 3/2009 | Alattar .................. G06T 1/0028 382/100 |
| 2009/0262932 A1 | 10/2009 | Petrovic |
| 2011/0093104 A1 | 4/2011 | Blesser |
| 2012/0274459 A1 | 11/2012 | Jaisimha et al. |
| 2014/0108020 A1* | 4/2014 | Sharma ................. G10L 19/018 704/500 |

OTHER PUBLICATIONS

Blesser, Barry, Director of Engineering, 25-Seven Systems, Inc.; Technical Properties of Arbitron's PPM System; pp. 1-8; Aug. 18, 2009.
Non-Final Office Action dated Jan. 24, 2014 for U.S. Appl. No. 14/097,716.
Non-Final Office Action dated Feb. 20, 2014 for U.S. Appl. No. 14/145,681.
Non-Final Office Action dated Aug. 11, 2014 for U.S. Appl. No. 14/216,041.
Notice of Allowance dated Sep. 15, 2015 for U.S. Appl. No. 14/514,849.
Non-Final Office Action dated Jan. 14, 2015 for U.S. Appl. No. 14/514,849.
Notice of Allowance dated Oct. 24, 2014 for U.S. Appl. No. 14/216,041.
Notice of Allowance dated Mar. 6, 2014 for U.S. Appl. No. 14/163,864.
Notice of Allowance dated Apr. 28, 2014 for U.S. Appl. No. 14/145,681.
International Search Report and Written Opinion dated Mar. 13, 2015 for corresponding International Application No. PCT/US2014/068485.

* cited by examiner

DATA CARRIAGE IN ENCODED AND PRE-ENCODED AUDIO BITSTREAMS

BACKGROUND

This disclosure describes a novel technique for improving the carriage of data in encoded and pre-encoded audio bitstreams.

The subject matter disclosed here may find particular application in the fields of broadcast and consumer audio. It may be applied to audio that is encoded in formats including but not limited to AC-3 (Dolby Digital), E-AC-3 (Dolby Digital Plus), AC-4, Dolby E, Dolby ED2, DTS, MPEG 1 Layer 2 and Layer 3 (i.e. MP3), AAC, HE AAC, and MPEG-H. It may also be applied to video formats.

SUMMARY OF THE INVENTION

The current invention described in this application provides a method whereby data that is normally carried as part of the audio essence, such as watermarking data or pilot tones, can be preserved even at very low coded audio bitrates. This is accomplished by splitting the analysis/extraction and enhancement/insertion of the watermark or pilot tone data and performing the former prior to low bitrate audio encoding and the latter after decoding.

Modern distribution of audio signals to consumers necessarily involves the use of data rate reduction or audio coding techniques to lower the required amount of data required to deliver these audio signal to consumers while causing minimal impact to the original audio quality. Data rate reduction or coding formats such as AC-3 (Dolby Digital), E-AC-3 (Dolby Digital Plus), AC-4, Dolby E, Dolby ED2, DTS, MPEG 1 Layer 2 and Layer 3 (i.e. MP3), AAC, HE AAC, MPEG-H, and others are commonly used in the delivery of audio to consumers.

Audio data reduction involves audio coding techniques that essentially transform a full audio representation into one that matches the thresholds of the human auditory system. Those parts of the original audio signal that cannot be perceived by the auditory system are not allocated data, thus lowering the data rate required to carry the audio signal.

Of course, to lower the data rate requirements further, the audio coding techniques can be more aggressively set to produce audible but possibly acceptable differences. These so-called artifacts are often an economic tradeoff enabling more channels to be carried in a given data bandwidth.

Extra data, such as, for example, watermark data that forms part of an audience measuring system, can be carried within audio signals using the same fundamental idea that the human auditory system is not perfect. Typically, this extra data is either added to the audible regions of the audio signal but at a low enough energy and duration that it is normally imperceptible, or by inserting tones outside of the normal frequency range of the auditory system. These techniques involving adding the extra data to audible regions of the audio signal at a low enough energy and duration to be imperceptible and inserting tones outside of the normal frequency range of the auditory system can generally be referred to as watermarking.

Of course, to increase the amount of data carried or increase its recoverability, its energy and or duration can be increased, thus possibly increasing audibility of this inserted data and or increasing the artifacts produced by the audio data reduction scheme.

Any system that relies upon sending unrelated extra data as part of the audio signal via watermarking risks damage or complete loss of this data when the combined signal is carried via an audio coding system. As they are based on the same exploitation of imperfections in the human auditory system, combining watermarking techniques to carry extra data in an audio signal with techniques to lower the required data rate for carrying that audio signal can result in a failure of both.

The present disclosure describes techniques whereby extra data can be formatted as if it was going to be inserted into the audio, but instead of inserting it, the data and or parameters about the data are carried around the audio encoder and multiplexed into the bitstream as part of the encoded audio data payload itself or as a separate data element.

The present disclosure also describes techniques whereby this extra data can be de-multiplexed at the point of reception and then parametrically inserted into the audio resulting from decoding.

The extra data is preserved regardless of the audio data reduction and avoids perceptibility by not requiring either higher energy or longer duration to compensate for possible degradation due to aggressive audio data reduction.

Further, since insertion is accomplished at the point of reception just before presentation to consumers, additional options are produced. One option is that real-time information about the reproduction environment can be used to modify the energy, duration or other parameters of the data before it is reinserted to compensate for things like environmental noise. Another option is that feedback from watermark or pilot tone detection devices can be accepted and also used to modify the energy, duration or other parameters of the data before or while it is reinserted to dynamically improve recoverability. Another option still is that a completely different scheme can be used for reinsertion, or reinsertion can be avoided completely and the data can be directly presented via an API or other means. Finally, this extra data can also be signed or be part of a data carriage system that carries signing data to ensure authenticity.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
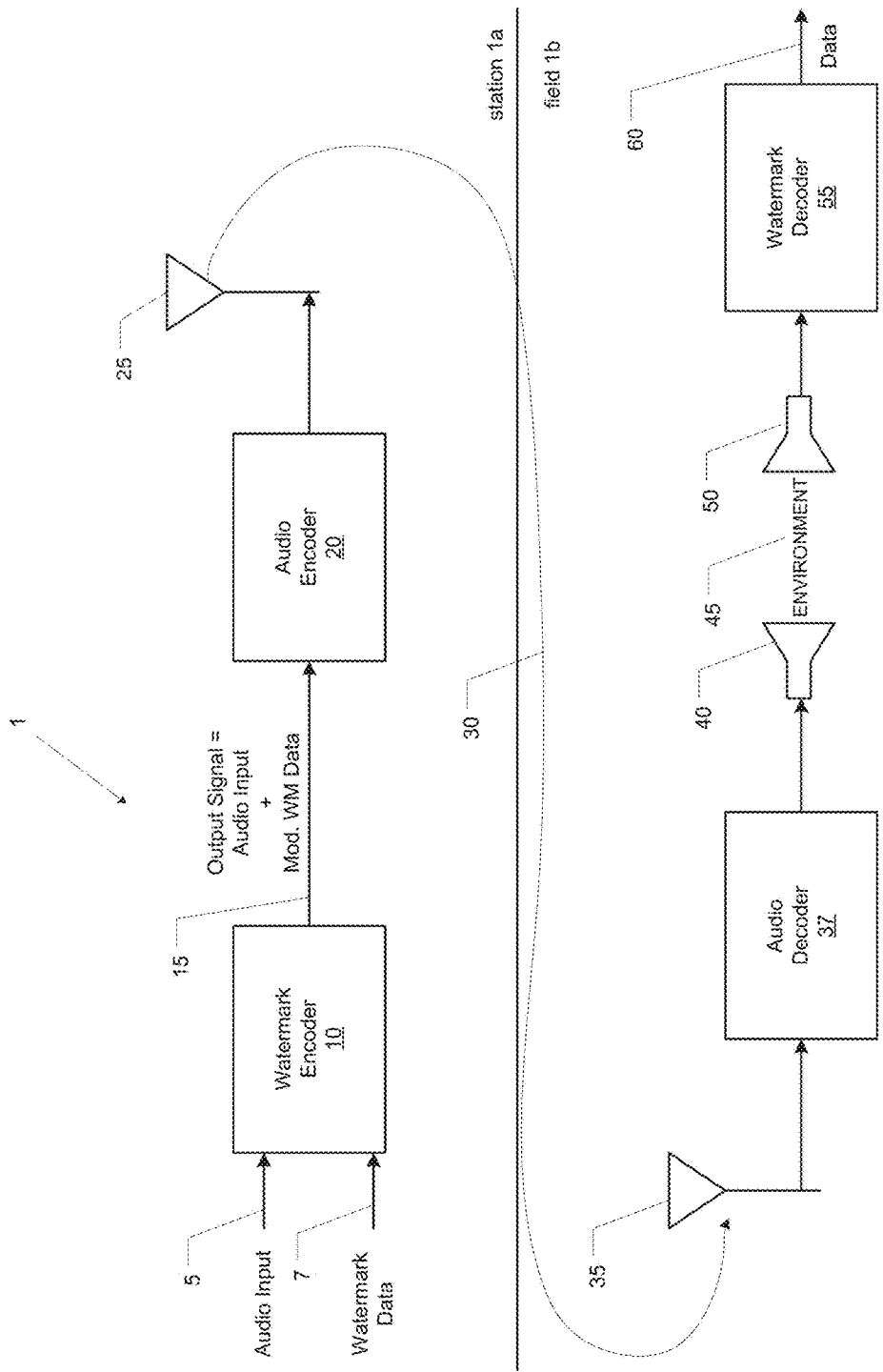
FIG. 1 illustrates a block diagram of an exemplary prior art system for carrying data, such as watermark data, in an encoded audio data frame of an audio signal.

FIG. 1 illustrates a block diagram of an exemplary prior art system 1 for carrying data, such as watermarking data, in an encoded audio data frame of an audio signal. In the illustrated embodiment, the system 1 includes two portions, a portion at the station 1a and a portion at the field 1b. The station 1a may correspond to the facilities where broadcasting takes place. The field 1b may correspond to the places where listeners listen to the broadcast. The field 1b could be a home, place of work, car, etc. In other embodiments, the station 1a portion may correspond to, for example, a recording studio while the field 1b may correspond to places where listeners listen to the recording.

The main component of the watermarking system 1 at the station 1a is the watermarking encoder 10. One example of a watermark encoder 10 is the encoder that forms part of the Portable People Meter™ (PPM™) system by The Nielsen Company. The encoder 10 receives the input signal 5 which is the source signal that the station intends to broadcast. In the illustrated embodiment, the input signal 5 is an audio signal. In other embodiments, the input signal 5 may be other than an audio signal such as, for example, a video signal. The encoder 10 also receives watermark data 7 which may include information about ownership, distribution method, transmission time, performer, producer, legal status, etc. of the material to be broadcasted.

The encoder 10 watermarks the data 7 onto the audio signal 5. That is, the encoder 10 receives the input signal 5 and embeds watermarks or pilot tones including, for example, station identification codes onto the program on the input signal 5. The watermark data is either added to the audible regions of the audio signal 5 but at a low enough energy and duration that it is normally imperceptible, or by inserting tones outside of the normal frequency range of the auditory system. Throughout this disclosure these techniques involving adding the extra data to audible regions of the audio signal at a low enough energy and duration to be imperceptible and inserting tones outside of the normal frequency range of the auditory system will be referred to generally as watermarking.

The result is the output signal 15, which includes the information in the input signal 5 and the watermark data 7. The audio encoder 20 encodes the output signal 15 including the audio signal and the watermark data as modified by the encoder 10 to fit within the audio signal 5. The audio encoder 20 encodes the output signal 15 using coding formats such as AC-3 (Dolby Digital), E-AC-3 (Dolby Digital Plus), AC-4, Dolby E, Dolby ED2, DTS, MPEG 1 Layer 2 and Layer 3 (i.e. MP3), AAC, HE AAC, MPEG-H, etc. The modulator/transmitter 25 at the station 1a broadcasts the transmission 30, which includes the information in the output signal 15, via RF, IP or physical media.

In the field 1b the receiver/demodulator 35 receives and demodulates the broadcast transmission 30 and the audio decoder 37 decodes and transmits a corresponding signal to be transduced by the loudspeaker 40 into the environment 45. The combination of the receiver/demodulator 35, decoder 37 and the loudspeaker 40 could be, for example, an AM/FM radio. The environment 45 may vary with the field 1b (e.g., home, place of work, car, etc.), the time of day (e.g., high traffic, low traffic), etc.

The transducer 50 (e.g., a microphone) receives the output of the loudspeaker 40 as modified by the environment 45 and transmits a corresponding signal to a decoder 55. The decoder 55 decodes the received signal to obtain the watermark or the data 60 within the watermark, which ideally would resemble the watermark data 7. Any detected data 60 may be transported to a host at a host site (not shown) who is managing the watermarking system to identify the station to which the user at the field 1b is listening.

As described above, ensuring that the audio signal 30 broadcasted by the station 1a is optimized for successful watermark decoding in the field 1b is important. The system 1, however, includes two functions that may work against each other to defeat this goal.

First, watermark encoding 10 involves carrying extra data within audio signals using the fundamental idea that the human auditory system is not perfect and, thus, would not be able to detect the extra data. Typically, this extra data is either added to the audible regions of the audio signal but at a low enough energy and duration that it is normally imperceptible, or by inserting tones outside of the normal frequency range of the auditory system.

The system 1, however, also uses data rate reduction or audio coding techniques in audio encoder 20 to lower the required amount of data required to deliver the audio signal to consumers while causing minimal impact to the original audio quality. Data rate reduction or coding formats such as AC-3 (Dolby Digital), E-AC-3 (Dolby Digital Plus), AC-4, Dolby E, Dolby ED2, DTS, MPEG 1 Layer 2 and Layer 3 (i.e. MP3), AAC, HE AAC, MPEG-H, and others are commonly used in the delivery of audio to consumers.

Audio data reduction involves audio coding techniques that essentially transform a full audio representation into one that matches the thresholds of the human auditory system. Those parts of the original audio signal that cannot be perceived by the auditory system are not allocated data, thus lowering the data rate required to carry the audio signal. Those parts of the original audio signal that cannot be perceived by the auditory system may include the watermark data inserted by the watermark encoder 10 and thus the watermark data may often not be allocated and thus may be essentially removed by the audio encoder 20.

Any system, such as system 1, that relies upon sending unrelated extra data as part of the audio signal via watermarking risks damage or complete loss of this data when the combined signal is carried via an audio coding system. As they are based on the same exploitation of imperfections in the human auditory system, combining techniques to carry extra data in an audio signal with techniques to lower the required data rate for carrying that audio signal can often result in a failure of both.

Figure 2:
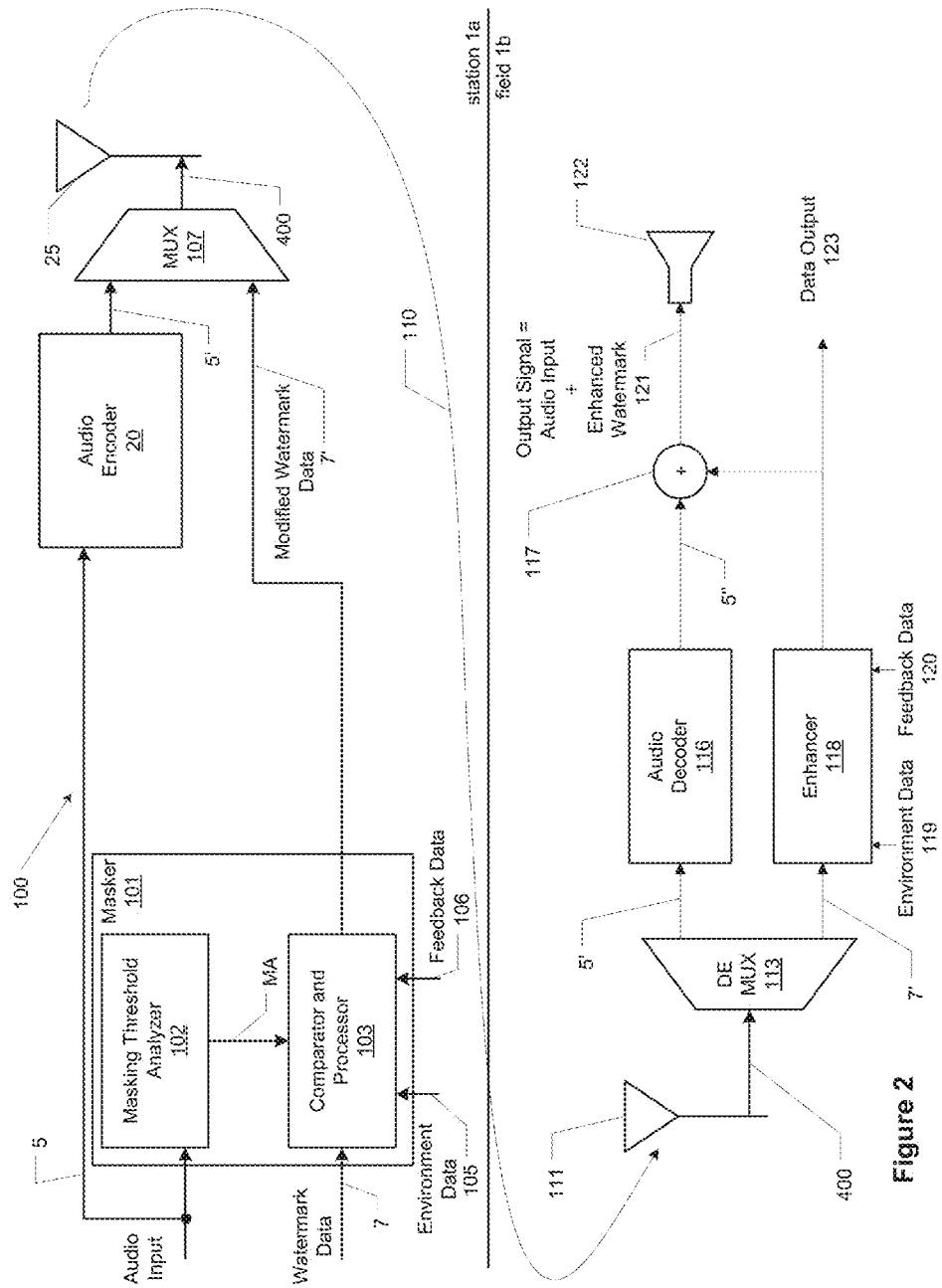
FIG. 2 illustrates a block diagram of an exemplary system for carrying data, such as watermark data, in an encoded audio data frame of an audio signal.

FIG. 2 illustrates a block diagram of an exemplary system 100 for carrying data, such as watermark data, in an encoded audio data frame of an audio signal.

At the station 1a, extra data, such as the watermark data 7, is formatted as if it was going to be inserted into the audio signal 5, but instead of inserting it, the data and/or parameters about the data are carried around the audio encoder 20 and multiplexed into the data frame 400 as part of the encoded audio data payload itself or as a separate data element.

In the field 1b, the data frame 400 is de-multiplexed upon reception and the extra data 7' is parametrically inserted into the audio 5" resulting from decoding. This way, the extra data is preserved regardless of the audio data reduction and avoids perceptibility by not requiring either higher energy or longer duration to compensate for possible degradation due to aggressive audio data reduction.

At the station 1a, the system 100 includes the audio encoder 20 that encodes the audio signal 5 into an encoded audio data frame 5'.

The system 100 also includes a masker 101 composed of a masking threshold analyzer 102 and comparator and processor 103. The masking threshold analyzer 102 receives the audio signal 5 and performs masking threshold analysis of the audio signal to determine timing, frequency and energy of portions of the watermark data to be inserted in the audio signal. The output MA of masking threshold analyzer 102 represents the dynamic temporal and frequency masking thresholds above which sounds are audible. The masking threshold analyzer 102 and specifically the masking algorithm is explained in some detail below in reference to FIG. 3.

Figure 3:
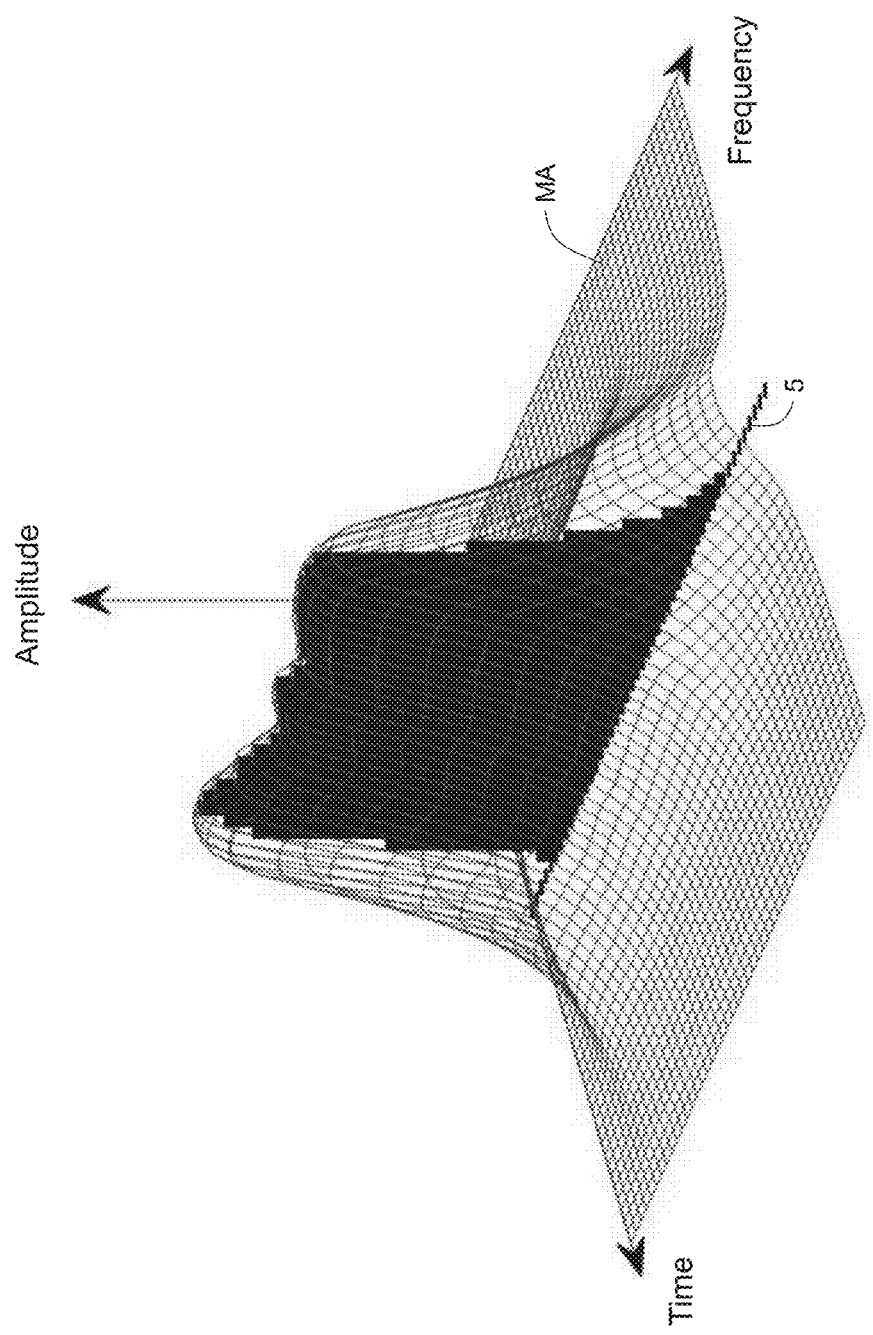
FIG. 3 illustrates an exemplary relationship between time-frequency spectra of a program's audio signal and a corresponding masking algorithm.

FIG. 3 illustrates an exemplary relationship between time-frequency spectra of the program's audio signal 5 and a corresponding masking algorithm MA. The figure shows a hypothetical segment of audio 5 as a vertical block of energy and a hashed masking envelope MA below which other audio components are inaudible. Under the envelope MA, other audio components at the appropriate time and frequency will be inaudible. The program's audio signal 5 is represented as the vertical rectangular block with a well-defined start and stop time, as well as a high and low frequency. The corresponding masking curve MA in the same time-frequency representation determines the maximum added watermark energy that will not be audible. Masking is represented by the envelope grid MA, under which the human ear cannot detect a signal.

Returning to FIG. 2, the comparator and processor 103 receives the output of the masking threshold analyzer 102 and the watermark data 7 and modifies watermark data 7 into a modified watermark data 7' that complies with the masking threshold analysis. The watermark data 7' may be encoded in a format (e.g., data blocks) such that it may be inserted into the encoded audio data frame 5'.

In the illustrated embodiment, the comparator and processor 103 accepts other inputs such as environment data 105 and feedback data 106. Environment data 105 is data regarding the environment where the audio signal is to be reproduced as audio and it could be an indication of background noise below which sounds are inaudible. Environment data 105 may be actual data regarding the actual environment in, for example, the field 1b in which the watermark is ultimately to be detected. The environment data 105 may also be one of several simulated environments such as the simulated sound of a bar, automobile, living room, etc. Environment data 105 could include, not only an indication of background noise, but other statistical information about the environment or users present in the environment. The environment data 105 may be applied to comparator and processor 103 to indicate a higher or lower threshold from that indicated by the masking threshold analyzer 102 which the watermark data must be above to be detected.

Feedback data 106 is data regarding potential detection or audibility of the watermark data inserted in the audio signal as reproduced as audio. Regarding detection, the feedback data 106 could be a dynamic measure of watermark recoverability success. Feedback data 106 could be a return from an acoustic or electrically connected watermark or pilot tone detection device using Bluetooth, infrared, supersonic tones, or some other mechanism to deliver statistics indicating the quality of the detected watermark or pilot tone in, for example, the field 1b. The feedback data 106 may be applied to comparator and processor 103 to indicate a higher or lower threshold from that indicated by the masking threshold analyzer 102 which the watermark data must be above to be detected.

The comparator and processor 103, having as inputs the output of the masking threshold analyzer 102, the simulated environment data 105 and/or the feedback data 106, provides a temporal and spectral window of the audio input 5 within which the watermark data 7 can be modified to fit below the masking threshold using techniques such as modulation. The modified data 7' is the output of the comparator and processor 103 and it corresponds to the watermark data 7 whose timing, frequency and energy has been modified to be inserted in the audio signal 5 optimizing the detectability versus audibility trade-off.

The system 100 also includes the multiplexer 107 that receives the encoded audio data frame 5' and the watermark data 7'. As explained in more detail below in reference to FIG. 4, the multiplexer 107 inserts the watermark data 7' into the encoded audio data frame 5'. The watermark data 7' may be inserted into the audio bitstream payload or carried as a separate data payload alongside the audio payload as explained in more detail below in reference to FIG. 5. The modified encoded audio data frame 400 is sent to transmitter 25 to be transmitted via RF or IP or physical means 110.

In the field 1b, the system 100 includes receiver 111 that receives the combined bitstream, modified encoded audio data frame 400, and sends it to the demultiplexer 113. As explained in more detail below in reference to FIG. 6, the demultiplexer 113 demultiplexes the modified encoded audio data frame 400 into the watermark data 7' and the encoded audio data frame 5'.

The system 100 also includes an audio decoder 116 that decodes the encoded audio data frame 5' into an audio signal 5" that resembles the audio signal 5.

The system 100 also includes an inserter 117 that inserts the watermark data 7' into the audio signal 5" to produce the output signal 121, an improved quality signal containing audio plus watermark or pilot tones for output via electrical and/or acoustical output 122 that enables external detection. The inserter 117 either parametrically reinserts the watermark data 7' via watermarking or pilot tones or some other method into the audio signal 5".

In one embodiment, the system 100 includes an enhancer 118 that modifies the watermark data 7' (or the audio signal 5" or both) based on environmental data 119 or feedback data 120 from an external detection device using means such as Bluetooth or RF, or even watermarking or pilot tones. Since insertion is performed at the point of reception, the field 1b, just before presentation to consumers, additional options are produced.

One option is that real-time information about the reproduction environment, environmental data 119, can be used to modify the energy, duration or other parameters of the data before it is reinserted to compensate for things like environmental noise. Another is that feedback data 120 from watermark or pilot tone detection devices can be accepted and also used to modify the energy, duration or other parameters of the data before or while it is reinserted to dynamically improve recoverability.

Another option is that a completely different scheme can be used for reinsertion, or reinsertion can be avoided completely and the data can be directly presented via an API or other means. To this end the data 7' (or the data 7' as modified based on the environment data 119 or the feedback data 120) may also be presented directly at data output 123 for further use. Finally, this extra data 7' can also be signed or be part of a data carriage system that carries signing data to ensure authenticity.

Figure 4:
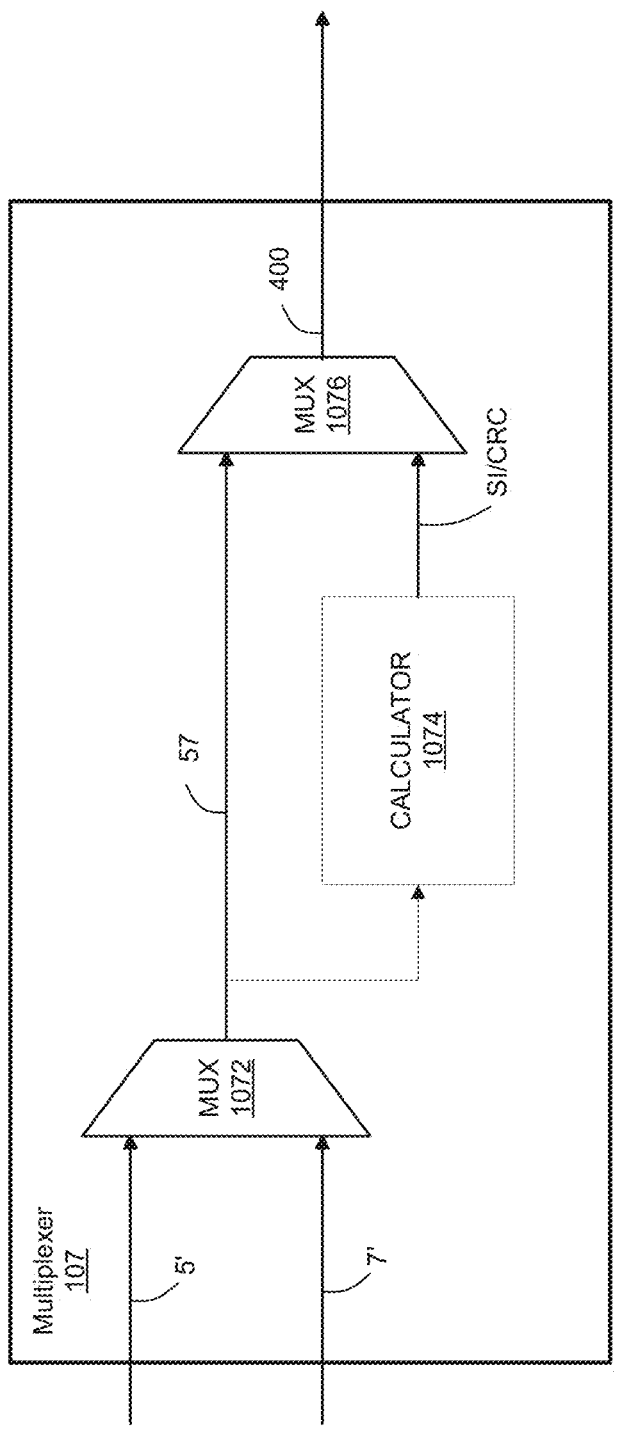
FIG. 4 illustrates a block diagram of an exemplary multiplexer.

FIG. 4 illustrates a block diagram of an exemplary multiplexer 107. The multiplexer 107 receives the modified watermark data 7' as modified by the comparator and processor 103 based on the output of the masking threshold analyzer 102 and, in some embodiments, based on the environment data 105 and/or the feedback data 106. The multiplexer 107 also receives the encoded audio data frame 5' having encoded therein a portion of the audio signal 5.

The multiplexer 107 includes an inserter 1072 that, as explained in more detail below in reference to FIG. 5, inserts the modified watermark data 7' as at least one additional data block between immediately adjacent data blocks of the encoded audio data frame 5'. The multiplexer 107 also includes a calculator 1074 that calculates new synchronization information (e.g., SI) and error check information (e.g., CRC) to account for the insertion of the at least one additional data block in the output 57 of the inserter 1072. For example, the new synchronization information may include an updated frame size code to be included in the synchronization information (e.g., SI) block to account for an increase in the frame size due to the insertion of the at least one additional block.

The multiplexer 107 also includes an inserter/extractor 1076 that modifies the data in the output 57 of the inserter 1072 according to the output SI/CRC of the calculator 1074. The inserter/extractor 1076 may modify the data by extracting the outdated synchronization information (e.g., SI) block and error check (e.g., CRC) block and inserting the updated synchronization information (e.g., SI) block and error check (e.g., CRC) block according to the output SI/CRC of the calculator 1074. The output of the multiplexer 107 is the modified encoded audio data frame 400.

Figure 5:
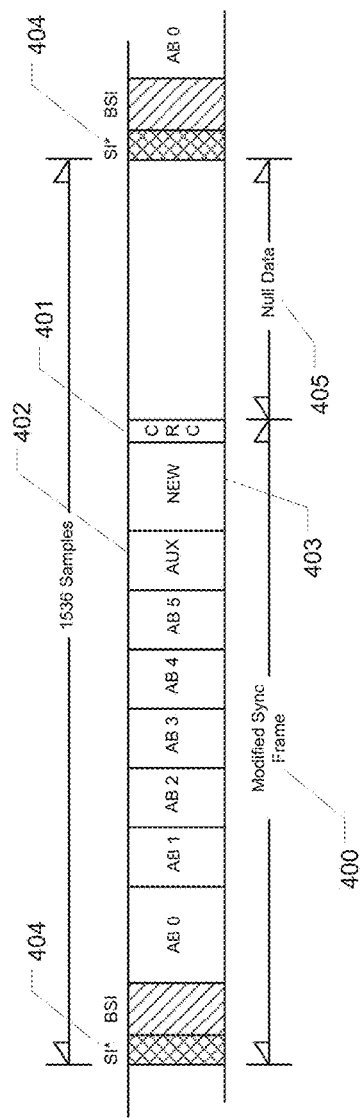
FIG. 5 illustrates an example modified encoded audio data frame.

FIG. 5 illustrates an example modified encoded audio data frame 400. Frame 400 includes an additional data block 403 (marked NEW), which has been inserted after the auxiliary data block 402 and before the CRC block 401. Additional data block 403 includes the additional data corresponding to the modified watermark data 7'. Additional data block 403 may also include null data and may be of a suitable data length such that the data length of frame 400 is fixed. Thus, additional data block 403 may be used to rate shape the overall data rate of the bit stream to a fixed value. The additional data in additional data block 403 may also include any data related to the encoded data or it may be data unrelated to the encoded data. Examples of other data that may be included in the additional data include, but are not limited to, advanced audio metadata, side channel data such as that used in ISO/IEC 23003-1 MPEG Surround, or any other type of data.

In another embodiment, in contrast to FIG. 5, the additional data block 403 may be inserted before the auxiliary data block 402. Inserting additional data block 403 at this location allows auxiliary data block 402 to remain in the position immediately before CRC block 401. Having auxiliary data block 402 at this position may be necessary in some applications such as audience measurement systems that may expect stored data in auxiliary data block 402 to be located at that particular location.

While a certain number of data blocks in a certain order are illustrated, it is to be appreciated that a greater and/or lesser number of data blocks arranged in different orders can be present in exemplary data structures.

Figure 6:
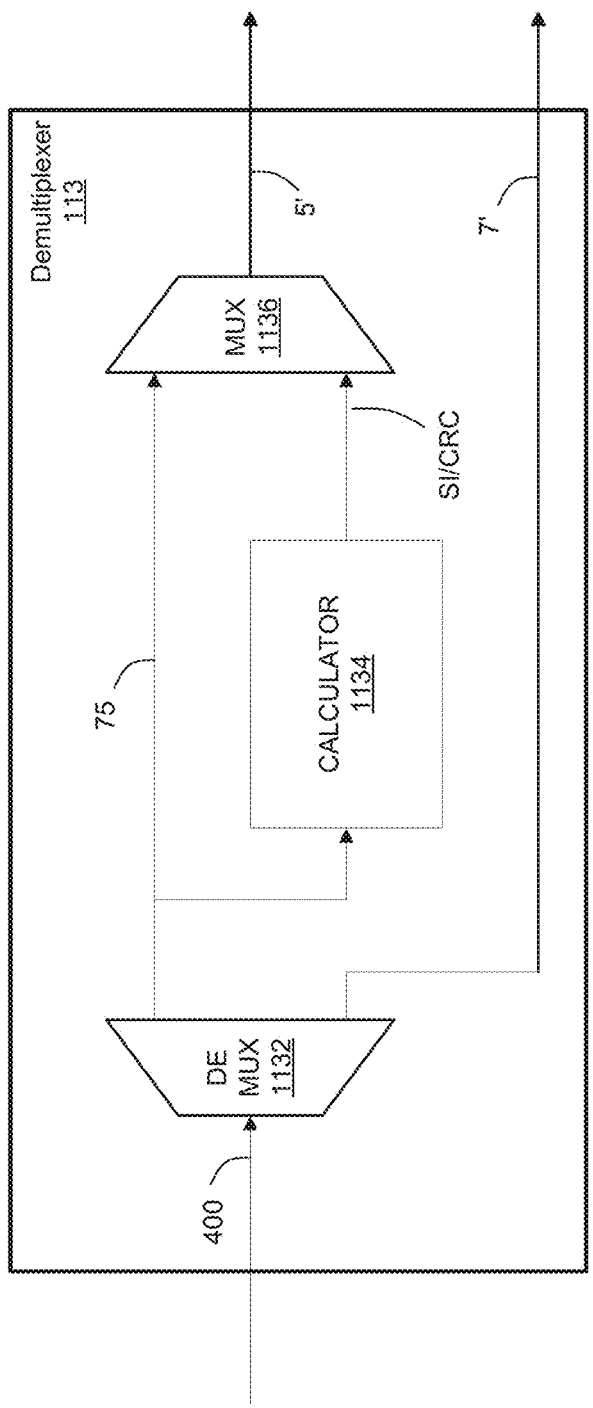
FIG. 6 illustrates a block diagram of an exemplary demultiplexer.

FIG. 6 illustrates a block diagram of an exemplary demultiplexer 113. The demultiplexer 113 receives the modified encoded audio data frame 400. The demultiplexer 113 includes an extractor 1132 that extracts from the modified encoded audio data frame 400 at least one data block including the modified watermark data 7'. The extractor 1132 may extract the at least one data block including the modified watermark data 7' such that at least two data blocks that were not immediately adjacent in the modified encoded audio data frame 400 become immediately adjacent.

The demultiplexer 113 also includes a calculator 1134 that calculates new synchronization information (e.g., SI) and error check information (e.g., CRC) to account for the extraction of the at least one additional data block in the output 75 of the extractor 1132. For example, the new synchronization information may include an updated frame size code to be included in the synchronization information (e.g., SI) block to account for a decrease in the frame size due to the extraction of the at least one additional block.

The demultiplexer 113 also includes an inserter/extractor 1136 that modifies the data in the output 75 of the extractor 1132 according to the output SI/CRC of the calculator 1134. The inserter/extractor 1136 may modify the data by extracting the outdated synchronization information (e.g., SI) block and error check (e.g., CRC) block and inserting the updated synchronization information (e.g., SI) block and error check (e.g., CRC) block according to the output SI/CRC of the calculator 1134. The outputs of the demultiplexer 113 are the encoded audio data frame 5' and the watermark data 7'.

Figure 7:
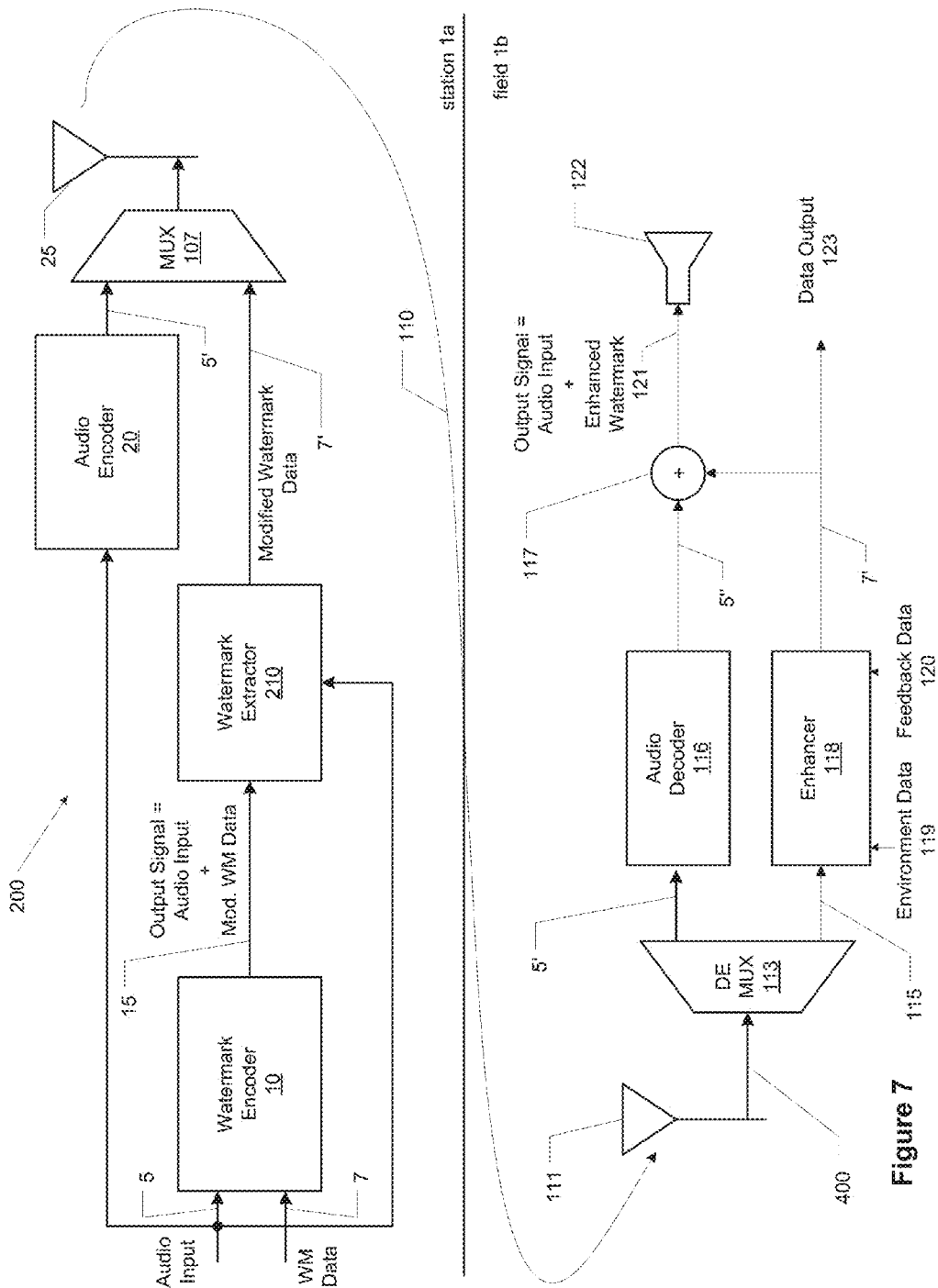
FIG. 7 illustrates a block diagram of an exemplary system for carrying data, such as watermark data, in an encoded audio data frame of an audio signal.

FIG. 7 illustrates a block diagram of an exemplary system 200 for carrying data, such as watermark data, in an encoded audio data frame of an audio signal. The system 200 is similar to the system 100 of FIG. 2 except that, at the station 1a, the extra data, such as the watermark data 7', is extracted from the output of a watermark encoder 10 such as that shown in FIG. 1. The watermark data 7' (or parameters about the watermark data) may then be carried around the audio encoder 20 and multiplexed into the bitstream as part of the encoded audio data payload itself or as a separate data element. The watermark data 7' may be encoded in a format (e.g., data block) such that it may be inserted into the encoded audio data frame 5'.

Like in the system 100, in the field 1b, the modified encoded audio data frame 400 is de-multiplexed upon reception and the watermark data 7' is parametrically inserted into the audio resulting from decoding. This way, the watermark data is preserved regardless of the audio data reduction and avoids perceptibility by not requiring either higher energy or longer duration to compensate for possible degradation due to aggressive audio data reduction.

At the station 1a, the system 200 includes the watermark encoder 10. One example of a watermark encoder 10 is the encoder that forms part of the Portable People Meter™ (PPM™) system by The Nielsen Company. The encoder 10 receives the input signal 5 which is the source signal that the station intends to broadcast. The encoder 10 receives and watermarks the input signal 5. That is, the encoder 10 receives the input signal 5 and embeds watermarks with, for example, station identification codes onto the audio program in the input signal 5. The result is the output signal 15, which includes the information in the input signal 5 (or at least most of the information in the input signal 5) and the information in the watermark signal 7 modified to comply with a masking threshold analysis as implemented by the watermark encoder 10.

The system 200 also includes a watermark extractor 210 that receives the input signal 5 and the output signal 15. From manipulation of those signals, the watermark extractor 210 effectively extracts the modified watermark data 7'. Thus, the watermark extractor 210 compensates for changes in the input signal portion of the output signal 15 introduced by the watermark encoder 10 substantially without regard to the internals of the specific encoder 10. The present disclosure describes the watermark extractor 210 to a certain extent in reference to FIG. 8 below. U.S. patent application Ser. No. 14/097,716 filed on Dec. 5, 2013, now U.S. Pat. No. 8,768,005, which is hereby incorporated by reference in its entirety, discloses additional details regarding the watermark extractor 210. Since the modified watermark data 7' is extracted from the output of the watermark encoder 10, the modified watermark data 7' complies with a masking threshold analysis as implemented by the watermark encoder 10.

The system 200 also includes the audio encoder 20 that encodes the audio signal 5 into an encoded audio data frame 5'.

The system 200 also includes the multiplexer 107 that receives the encoded audio data frame 5' and the modified watermark data 7' extracted from the output of the watermark encoder 10. As explained in more detail above in reference to FIG. 4, the multiplexer 107 inserts the watermark data 7' into the encoded audio data frame 5'. The watermark data 7' may be inserted into the audio bitstream payload or carried as a separate data payload alongside the audio payload as explained in more detail above in reference to FIG. 5. The modified encoded audio data frame 400 is sent to transmitter 25 to be transmitted via RF or IP or physical means 110.

In the field 1b, the system 100 includes receiver 111 that receives the combined bitstream, modified encoded audio data frame 400, and sends it to the demultiplexer 113. As explained in more detail above in reference to FIG. 6, the demultiplexer 113 demultiplexes the modified encoded audio data frame 400 into the watermark data 7' and the encoded audio data frame 5'.

The system 200 also includes the audio decoder 116 that decodes the encoded audio data frame 5' into an audio signal 5" that resembles the audio signal 5.

The system 200 also includes the inserter 117 that inserts the watermark data 7' into the audio signal 5" to produce the output signal 121, an improved quality signal containing audio plus watermark or pilot tones for output via electrical and/or acoustical output 122 that enables external detection. The inserter 117 either parametrically reinserts the watermark data 7' via watermarking or pilot tones or some other method into the audio signal 5".

As does the system 100, in one embodiment, the system 200 includes an enhancer 118 that modifies the watermark data 7' based on environmental data 119 or feedback data 120 from an external detection device using means such as Bluetooth or RF, or even watermarking or pilot tones. Since insertion is performed at the point of reception, the field 1b, just before presentation to consumers, additional options are produced.

One option is that real-time information about the reproduction environment, environmental data 119, can be used to modify the energy, duration or other parameters of the data before it is reinserted to compensate for things like environmental noise. Another is that feedback data 120 from watermark or pilot tone detection devices can be accepted and also used to modify the energy, duration or other parameters of the data before or while it is reinserted to dynamically improve recoverability.

Another option is that a completely different scheme can be used for reinsertion, or reinsertion can be avoided completely and the data can be directly presented via an API or other means. To this end the data 7' (or the data 7' as modified based on the environment data 119 or the feedback data 120) may also be presented directly at data output 123 for further use. Finally, this extra data can also be signed or be part of a data carriage system that carries signing data to ensure authenticity.

Figure 8:
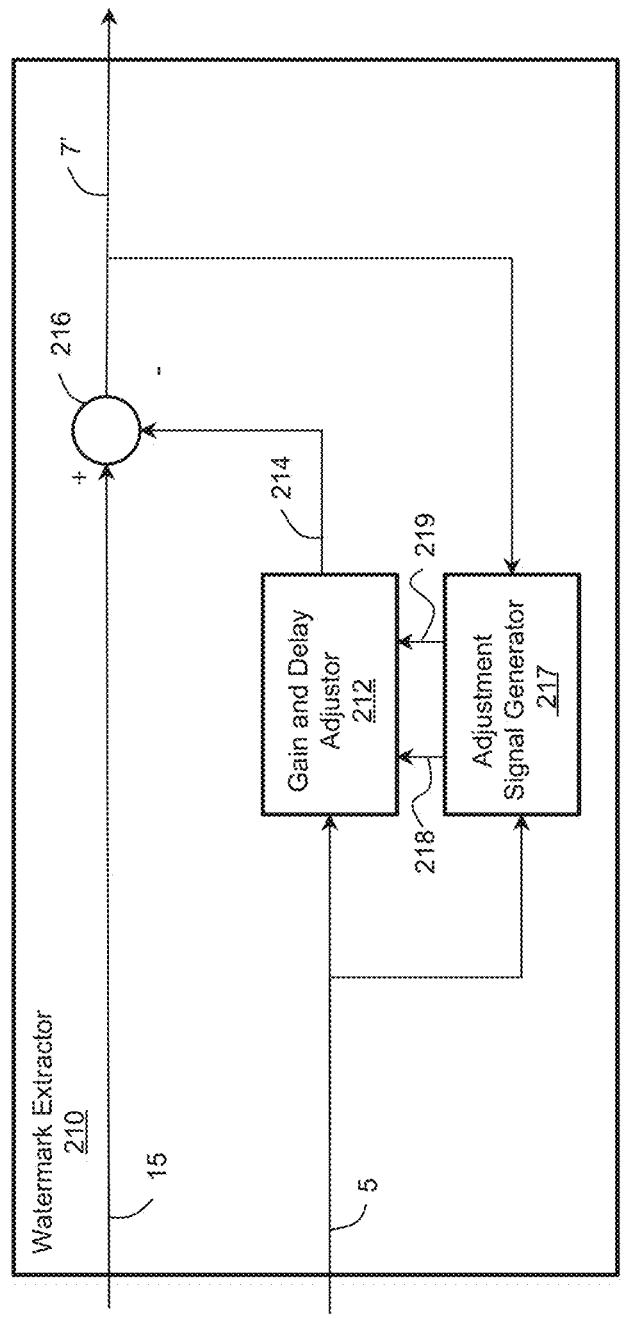
FIG. 8 illustrates a simplified block diagram of an exemplary watermark extractor for extracting a modified watermark data from an output signal of a watermarking encoder.

FIG. 8 illustrates a simplified block diagram of an exemplary watermark extractor 210 for extracting a modified watermark data 7' from an output signal 15 of a watermarking encoder 10. The watermark extractor 210 as well as other related apparatuses and methods are explained in detail in U.S. patent application Ser. No. 14/514,849 filed on Oct. 15, 2014, which is a continuation-in-part of U.S. patent application Ser. No. 14/216,041 filed on Mar. 17, 2014, which is a continuation-in-part of U.S. patent application Ser. No. 14/163,864 filed on Jan. 24, 2014, now U.S. Pat. No. 8,768,714, which is a continuation-in-part of U.S. patent application Ser. No. 14/145,681 filed on Dec. 31, 2013, now U.S. Pat. No. 8,768,710, which is a continuation-in-part of U.S. patent application Ser. No. 14/097,716 filed on Dec. 5, 2013, now U.S. Pat. No. 8,768,005, all of which are hereby incorporated by reference in their entirety.

The watermark extractor 210 receives the input signal 5 and the output signal 15.

The watermark extractor 210 includes a gain and delay adjustor 212. The adjustor 212 receives the input signal 5 and adjusts its gain and delay to match the gain and delay of the output signal 15 created by the encoder 10. The output of the adjustor 212 is the adjusted input signal 214 which corresponds to the input signal 5 adjusted to compensate for changes in gain and delay in the output signal 15 introduced by the watermarking encoder 10.

The watermark extractor 210 also includes a subtractor 216 that subtracts the adjusted input signal 214 from the output signal 15 to obtain the modified watermark data 7'.

The watermark extractor 210 further includes an adjustment signal generator 217 that receives the input signal 5 and the modified watermark data 7' to generate a gain adjustment signal 218 and a delay adjustment signal 219 based on the received signals. The adjustor 212 receives the gain adjustment signal 218 and the delay adjustment signal 219 in addition to the input signal 5, and adjusts gain and delay of the input signal 5 based on the gain adjustment signal 218 and the delay adjustment signal 219, respectively, to generate the adjusted input signal 214.

The watermark extractor 210 outputs the difference between the output signal 15 and the adjusted input signal 214 as the modified watermark data 7'.

In another embodiment (not shown), the adjustor 212 may receive the output signal 15 and adjust its gain and instead of adjusting the gain and delay of the input signal 5. In this embodiment, the output of the adjustor 212 is an adjusted output signal which corresponds to the output signal 15 adjusted to compensate for changes in gain and delay introduced by the watermarking encoder 10. The subtractor 216 may then subtract the input signal from the adjusted output signal to obtain the watermark signal. In this embodiment, the watermark extractor 210 may include a delay block to delay the input signal 5 before it is input to the encoder 10 to allow time for adjusting gain and delay of the output signal 15. The delayed input signal 5 may be applied to the adjustment signal generator 217 and the input signal 5 to the encoder 10 or viceversa. The adjustment signal generator 217 receives the input signal 5 and the signal 20 to generate a gain adjustment signal and a delay adjustment signal based on the received signals. The adjustor 212 receives the gain adjustment signal 218 and the delay adjustment signal 219 in addition to the output signal 15, and adjusts gain and delay of the output signal 15 based on the gain adjustment signal 218 and the delay adjustment signal 219, respectively, to generate the adjusted output signal. In this embodiment, the adjustor 212 may also compensate for the delay introduced in the input signal 5 by the delay block. The watermark extractor 210 outputs the difference between the adjusted output signal and the input signal as the modified watermark data 7'.

Figure 9:
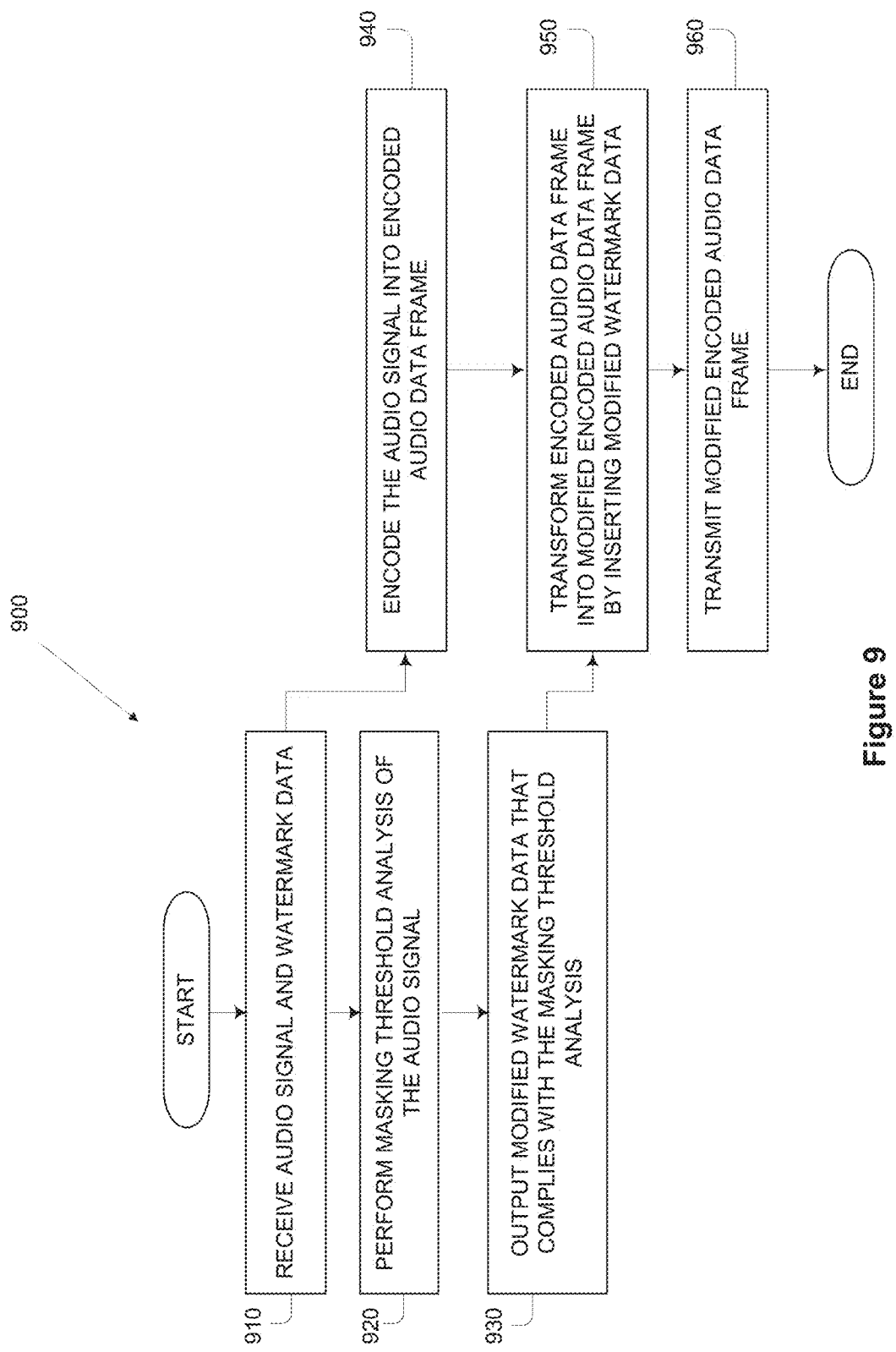
FIG. 9 illustrates a flow diagram for an exemplary method for carrying watermark data in an encoded audio data frame of an audio signal.
Figure 10:
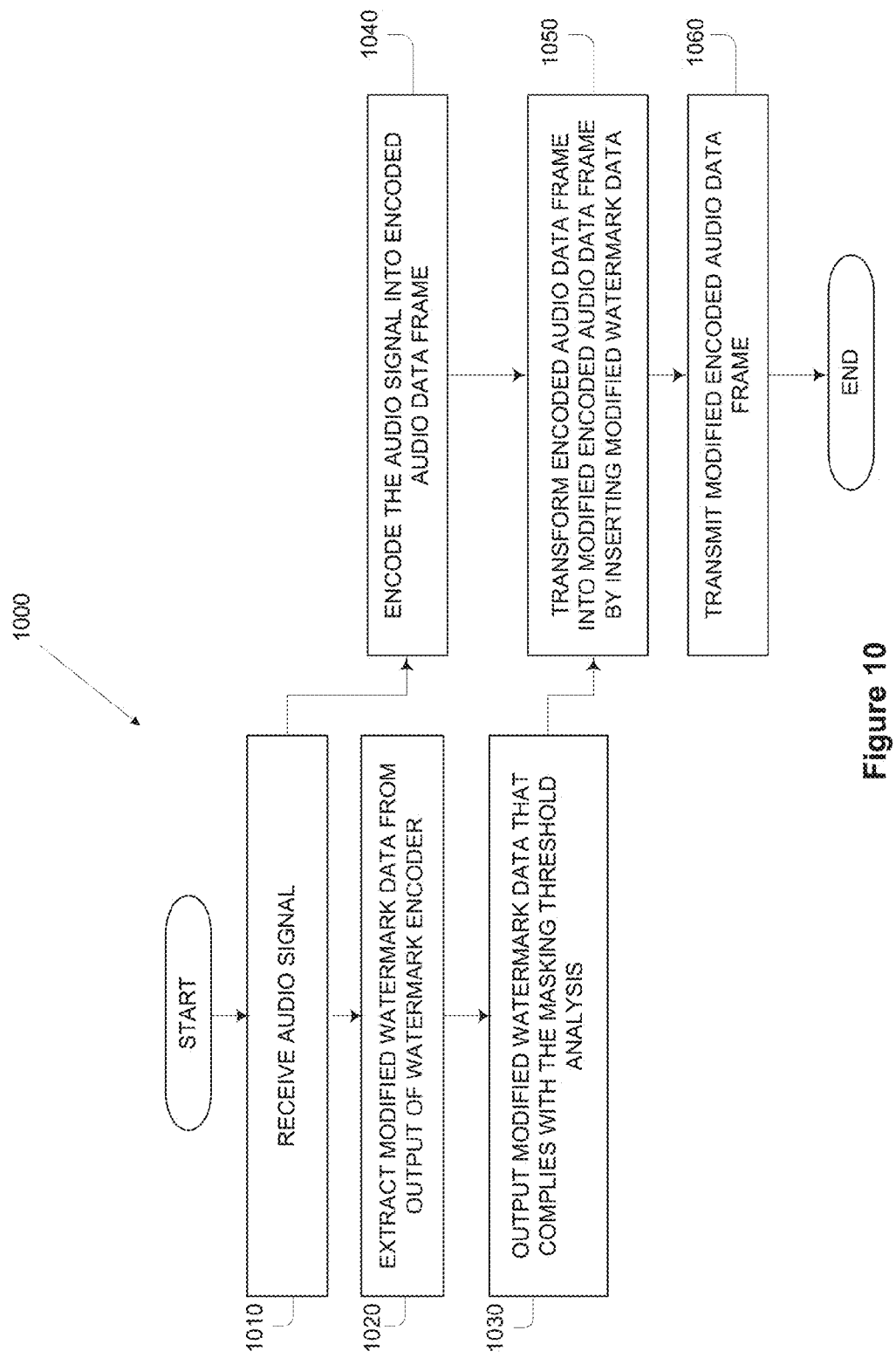
FIG. 10 illustrates a flow diagram for an exemplary method for carrying watermark data in an encoded audio data frame of an audio signal.
Figure 11:
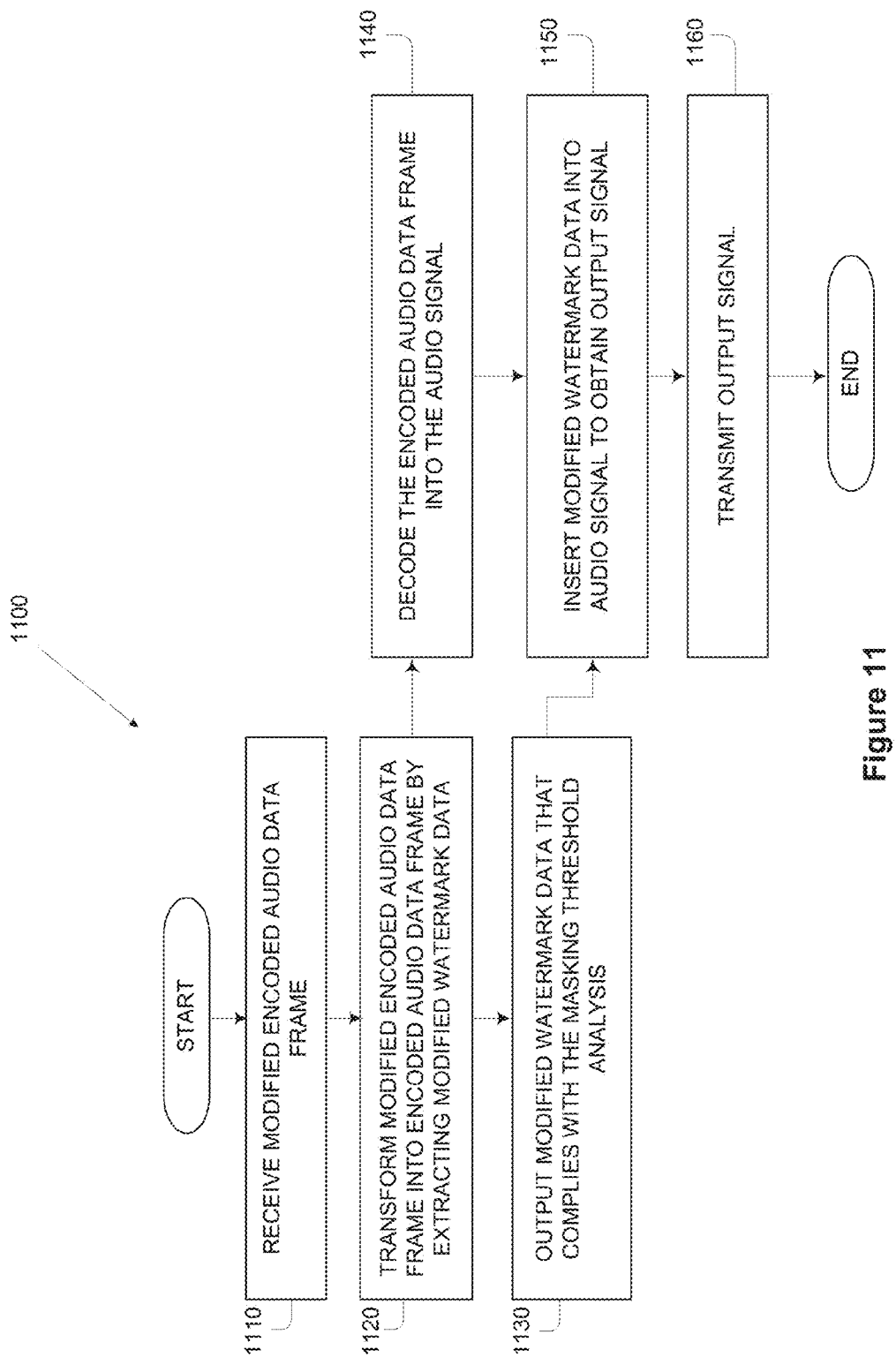
FIG. 11 illustrates a flow diagram for an exemplary method for extracting watermark data from a modified encoded audio data frame of an audio signal.

Exemplary methods may be better appreciated with reference to the flow diagram of FIGS. 9-11. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology. Furthermore, additional methodologies, alternative methodologies, or both can employ additional blocks, not illustrated.

In the flow diagrams, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 9 illustrates a flow diagram for an exemplary method 900 for carrying watermark data in an encoded audio data frame of an audio signal. The method 900 includes at 910 receiving the audio signal and the watermark data. At 920, the method 900 performs the masking threshold analysis of the audio signal to determine timing, frequency and energy of portions of the watermark data to be inserted in the audio signal. At 930, the method 900 outputs the modified watermark data that complies with the masking threshold analysis.

At 940, the method 900 may include encoding the audio signal into an encoded audio data frame. At 950, the method 900 transforms the encoded audio data frame into a modified encoded audio data frame by: a) inserting at least one additional data block between immediately adjacent data blocks of the encoded audio data frame and b) modifying data in the synchronization information block and the error check block to account for the inserting of the at least one additional data block. The at least one additional data block includes the modified watermark data as modified based on the masking threshold analysis of the audio signal. Modifying data in the synchronization information block and the error check block includes updating a frame size code included in the synchronization information block to account for an increase in the frame size due to the insertion of the at least one additional block.

At 960, the method 900 may transmit the modified encoded audio data frame.

In one embodiment, the method 900 includes enhancing the modified watermark data based on simulated environment data regarding the environment where the audio signal is to be reproduced as audio. In another embodiment, the method 900 includes enhancing the modified watermark data based on feedback data regarding at least one of detection or audibility of the watermark data in the audio signal as reproduced as audio.

FIG. 10 illustrates a flow diagram for an exemplary method 1000 for carrying watermark data in an encoded audio data frame of an audio signal. The method 1000 includes at 1010 receiving an output signal of a watermarking encoder including an audio portion corresponding to the audio signal and a watermark portion corresponding to the modified watermark data. At 1020, the method 1000 includes extracting the modified watermark data from the output signal of the watermarking encoder. At 1030, the method 1000 outputs the modified watermark data that complies with the masking threshold analysis as implemented by the watermarking encoder.

At 1040, the method 1000 may include encoding the audio signal into an encoded audio data frame. At 1050, the method 1000 transforms the encoded audio data frame into a modified encoded audio data frame by: a) inserting at least one additional data block between immediately adjacent data blocks of the encoded audio data frame and b) modifying data in the synchronization information block and the error check block to account for the inserting of the at least one additional data block. The at least one additional data block includes the modified watermark data as modified based on the masking threshold analysis of the audio signal. Modifying data in the synchronization information block and the error check block includes updating a frame size code included in the synchronization information block to account for an increase in the frame size due to the insertion of the at least one additional block.

At 1060, the method 1000 may transmit the modified encoded audio data frame.

In one embodiment, the method 1000 includes enhancing the modified watermark data based on simulated environment data regarding the environment where the audio signal is to be reproduced as audio. In another embodiment, the method 1000 includes enhancing the modified watermark data based on feedback data regarding at least one of detection or audibility of the watermark data in the audio signal as reproduced as audio.

FIG. 11 illustrates a flow diagram for an exemplary method 1100 for extracting watermark data from a modified encoded audio data frame of an audio signal. The method 1100 includes at 1110 receiving the modified encoded audio data frame. At 1120, the method 1100 includes transforming the modified encoded audio data frame into an encoded audio data frame. This transformation may include extracting from the modified encoded audio data frame at least one data block including modified watermark data, as modified based on a masking threshold analysis of the audio signal, such that at least two data blocks that were not immediately adjacent in the modified encoded audio data frame become immediately adjacent. The transformation may also include unmodifying data in a synchronization information block and an error check block of the modified encoded audio data frame to account for the extraction of the at least one data block. A frame size code of the synchronization information block may be updated to account for a decrease in frame size due to the extraction of the at least one data block.

At 1130, the method 1100 outputs the modified watermark data and the encoded audio data frame.

At 1140, the method 1100 may include decoding the encoded audio data frame to obtain the audio signal. At 1150, the method 1100 inserts the modified watermark data into the audio signal to obtain an output signal. At 1160, the method 1100 may transmit the output signal.

In one embodiment, the method 1100 includes enhancing the modified watermark data based on environmental data regarding the environment where the audio signal is to be reproduced as audio to obtain enhanced modified watermark data and inserting the enhanced modified watermark data into the audio signal. In another embodiment, the method 1100 includes enhancing the modified watermark data based on feedback data regarding at least one of detection or audibility of the watermark data in the output signal as reproduced as audio to obtain enhanced modified watermark data, and inserting the enhanced modified watermark data into the audio signal. In yet another embodiment, the method 1100 includes transmitting the encoded audio data frame to be at least one of decoded or reproduced as audio, and transmitting a data signal including the information in the modified watermark data for consumption by a downstream process.

While FIGS. 9-11 illustrate various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other exemplary methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

Figure 12:
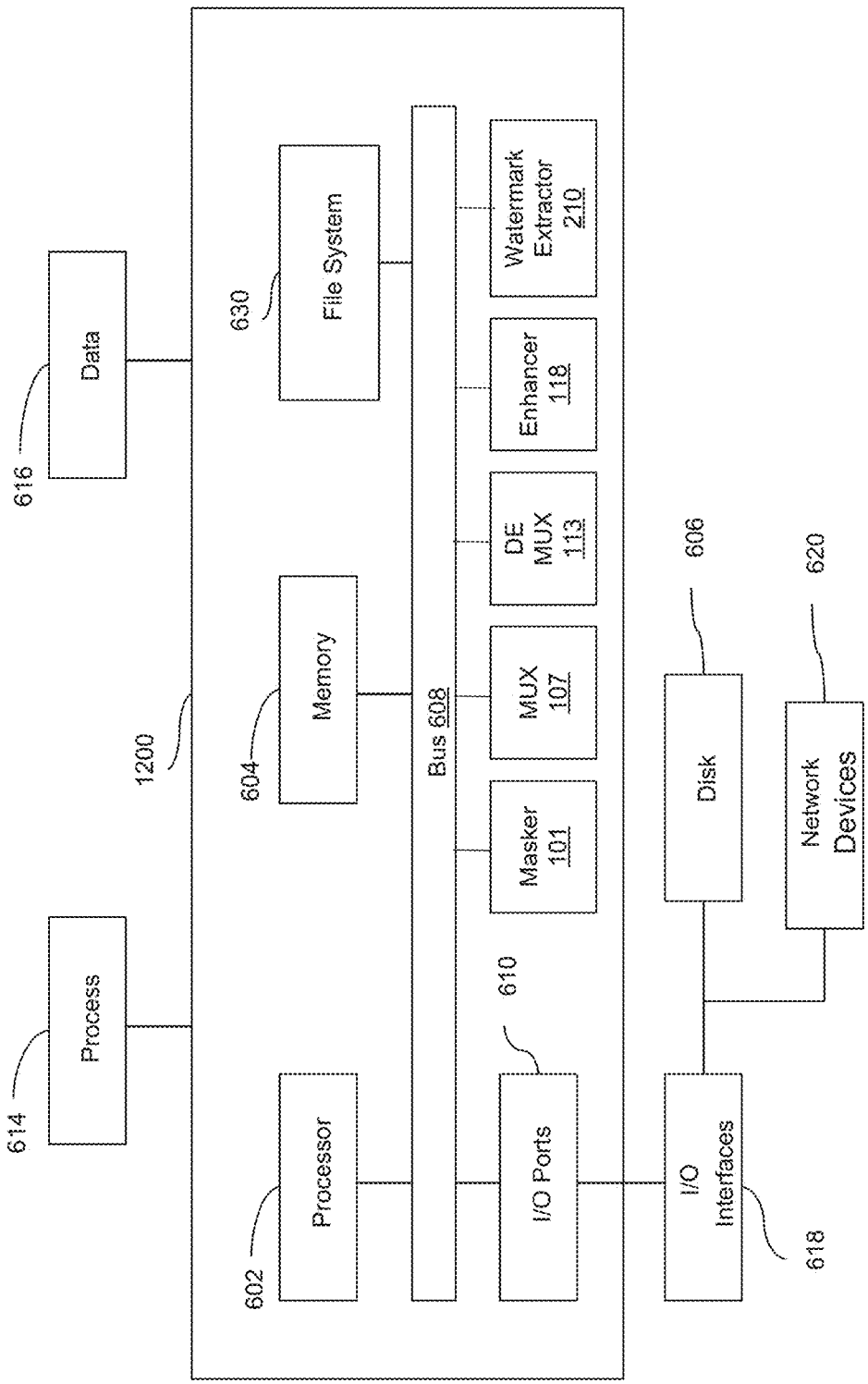
FIG. 12 illustrates a block diagram of an exemplary machine for carrying watermark data in an encoded audio data frame of an audio signal.

FIG. 12 illustrates a block diagram of an exemplary machine 1200 for carrying or extracting watermark data in an encoded audio data frame of an audio signal. The machine 1200 includes a processor 602, a memory 604, and I/O Ports 610 operably connected by a bus 608.

In one example, the machine 1200 may receive input signals including the audio signal, the watermark data, the modified encoded audio data frame, etc. and output signals including the modified encoded audio data frame, the output signal including the audio signals and the watermark data, etc. via, for example, I/O Ports 610 or I/O Interfaces 618. The machine 1200 may also include the masker 101, the multiplexer 107, the demultiplexer 113, the enhancer 118, and the watermark extractor 210 as described above. Thus, the masker 101, the multiplexer 107, the demultiplexer 113, the enhancer 118, and the watermark extractor 210 may be implemented in machine 1200 as hardware, firmware, software, or a combination thereof and may provide means for performing their respective functions as described herein.

The processor 602 can be a variety of various processors including dual microprocessor and other multi-processor architectures. The memory 604 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the machine 1200 via, for example, an I/O Interfaces (e.g., card, device) 618 and an I/O Ports 610. The disk 606 can include, but is not limited to, devices like a magnetic disk drive, a solid state disk drive, a floppy disk drive, a tape drive, a Zip drive, a flash memory card, or a memory stick. Furthermore, the disk 606 can include optical drives like a CD-ROM, a CD recordable drive (CD-R drive), a CD rewriteable drive (CD-RW drive), or a digital video ROM drive (DVD ROM). The memory 604 can store processes 614 or data 616, for example. The disk 606 or memory 604 can store an operating system that controls and allocates resources of the machine 1200.

The bus 608 can be a single internal bus interconnect architecture or other bus or mesh architectures. While a single bus is illustrated, it is to be appreciated that machine 1200 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 1200 may interact with input/output devices via I/O Interfaces 618 and I/O Ports 610. Input/output devices can include, but are not limited to, a keyboard, a microphone, a pointing and selection device, cameras, video cards, displays, disk 606, network devices 620, and the like. The I/O Ports 610 can include but are not limited to, serial ports, parallel ports, and USB ports.

The machine 1200 can operate in a network environment and thus may be connected to network devices 620 via the I/O Interfaces 618, or the I/O Ports 610. Through the network devices 620, the machine 1200 may interact with a network. Through the network, the machine 1200 may be logically connected to remote computers. The networks with which the machine 1200 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 620 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

For ease of explanation, the present disclosure describes examples in the context of the AC-3 system as described in the Digital Audio Compression Standard (AC-3) document A52/A of the Advanced Television Systems Committee (ATSC) and metadata as described in ETSI TS 102 366 (Annex H) such as, for example, the Extensible Metadata Format (EMDF) used to carry information and control data about audio signals into which it is embedded and in SMPTE RDD 6. The principles of the present disclosure, however, are not limited to those contexts and may be practiced in various other contexts including any coding system (e.g., AC-3, DTS, MPEG-2, AAC, HE AAC, and so on) that supports auxiliary data and any such embedded metadata schemes included with any compressed audio including ETSI TS 103 190 (section 4.3.15) or baseband PCM audio system including metadata as described in ATSC A52:2012 and A/85:2013 or even the SMPTE 337M standard. The disclosed invention is also applicable to non-encoded systems. The disclosed invention may be implemented in encoded or non-encoded systems, in the analog or digital domain, in hardware or software, in real-time or non-real time. The systems 100 and 200 may be implemented using software, hardware, analog or digital techniques and can run real time or faster or slower than real time or some hybrid of all of these.

DEFINITIONS

The following includes definitions of selected terms employed herein. The definitions include various examples or forms of components that fall within the scope of a term and that may be used for implementation. The examples are not intended to be limiting. Both singular and plural forms of terms may be within the definitions.

"Content" corresponds to still images, segments of audio media, video media, or audio/visual (AV) media and include information that is embodied, stored, transmitted, received, processed, or otherwise used with at least one medium. Common media content formats include FLV format (flash video), Windows Media Video, RealMedia, Quicktime, MPEG, MP3, DivX, JPEGs, and Bitmaps. As used herein, the terms "media clips", "media content," "information content," and "content" may be used interchangeably.

"Data store," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted, or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A method for a machine or group of machines to carry watermark data in an encoded audio data frame of an audio signal, the method comprising:
receiving the encoded audio data frame having encoded therein a portion of the audio signal, wherein the encoded audio data frame includes a plurality of data blocks, wherein the plurality of data blocks includes,
a synchronization information block,
at least one encoded data block, and
an error check block;
receiving modified watermark data as modified based on a masking threshold analysis of the audio signal; and
transforming the encoded audio data frame into a modified encoded audio data frame by:
inserting at least one additional data block between immediately adjacent data blocks of the encoded audio data frame, wherein the at least one additional data block includes the modified watermark data as modified based on the masking threshold analysis of the audio signal, and
modifying data in the synchronization information block and the error check block to account for the inserting of the at least one additional data block, wherein the modifying includes updating a frame size code included in the synchronization information block to account for an increase in the frame size due to the insertion of the at least one additional block.

2. The method of claim 1, wherein the receiving the modified watermark data comprises:
receiving an output signal of a watermarking encoder including an audio portion corresponding to the audio signal and a watermark portion corresponding to the modified watermark data; and
extracting the modified watermark data from the output signal of the watermarking encoder.

3. The method of claim 1, wherein the receiving the modified watermark data comprises:
receiving the audio signal;
performing the masking threshold analysis of the audio signal to determine timing and energy of portions of the watermark data to be inserted in the audio signal; and
outputting the modified watermark data to comply with the masking threshold analysis.

4. The method of claim 1, wherein the receiving the modified watermark data includes:
enhancing the modified watermark data based on simulated environment data regarding the environment where the audio signal is to be reproduced as audio.

5. The method of claim 1, wherein the receiving the modified watermark data includes:
enhancing the modified watermark data based on feedback data regarding at least one of detection or audibility of the watermark data in the audio signal as reproduced as audio.

6. A machine or group of machines for carrying watermark data in an encoded audio data frame of an audio signal, comprising:
a multiplexer circuit configured to receive modified watermark data as modified based on a masking threshold analysis of the audio signal and to receive the encoded audio data frame having encoded therein a portion of the audio signal, wherein the encoded audio data frame includes a plurality of data blocks, wherein the plurality of data blocks includes:
a synchronization information block,
at least one encoded data block, and
an error check block;
the multiplexer circuit configured to transform the encoded audio data frame into a modified encoded audio data frame by:
inserting at least one additional data block between immediately adjacent data blocks of the encoded audio data frame, wherein the at least one additional data block includes the modified watermark data as modified based on the masking threshold analysis of the audio signal, and modifying data in the synchronization information block and the error check block to account for the inserting of the at least one additional data block, wherein the modifying includes updating a frame size code included in the synchronization information block to account for an increase in the frame size due to the insertion of the at least one additional block.

7. The machine or group of machines of claim 6, comprising:

a watermark extractor circuit configured to:

receive an output signal of a watermarking encoder including an audio portion corresponding to the audio signal and a watermark portion corresponding to the modified watermark data; and extract the modified watermark data from the output signal of the watermarking encoder.

8. The machine or group of machines of claim 6, comprising:

a masker circuit configured to:

receive the audio signal;

perform the masking threshold analysis of the audio signal to determine timing and energy of portions of the watermark data to be inserted in the audio signal; and output the modified watermark data to comply with the masking threshold analysis.

9. The machine or group of machines of claim 6, comprising:

a masker circuit configured to enhance the modified watermark data based on simulated environment data regarding the environment where the audio signal is to be reproduced as audio.

10. The machine or group of machines of claim 6, comprising:

a masker circuit configured to enhance the modified watermark data based on feedback data regarding at least one of detection or audibility of the watermark data in the audio signal as reproduced as audio.

* * * * *